(12) United States Patent
Yim et al.

(10) Patent No.: US 11,428,587 B2
(45) Date of Patent: Aug. 30, 2022

(54) FORCE SENSING DEVICE AND ELECTRONIC DEVICE INCLUDING FORCE SENSING DEVICE

(71) Applicant: Samsung Electro-Mechanics Co., Ltd., Suwon-si (KR)

(72) Inventors: Nam Gyun Yim, Suwon-si (KR); Sol Ji Chang, Suwon-si (KR); Chang Ju Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 25 days.

(21) Appl. No.: 16/895,309

(22) Filed: Jun. 8, 2020

(65) Prior Publication Data

US 2021/0239543 A1  Aug. 5, 2021

(30) Foreign Application Priority Data

Feb. 5, 2020 (KR) .................. 10-2020-0013913

(51) Int. Cl.
*G01L 1/04* (2006.01)
*G01L 5/00* (2006.01)

(52) U.S. Cl.
CPC .............. *G01L 1/04* (2013.01); *G01L 5/0038* (2013.01)

(58) Field of Classification Search
CPC ....... G01L 1/04; G01L 5/0038; G06F 3/0202; B60N 2/002
USPC ....................................... 73/862.636
See application file for complete search history.

(56) References Cited

U.S. PATENT DOCUMENTS

| | | | |
|---|---|---|---|
| 9,877,389 B2* | 1/2018 | Yoo .................. | H05K 3/365 |
| 2016/0128217 A1 | 5/2016 | Yoo et al. | |
| 2018/0022232 A1* | 1/2018 | Kawahira .............. | H01H 13/10 |
| | | | 73/862.628 |
| 2020/0290483 A1* | 9/2020 | Nakazaki ............... | A47C 7/62 |

FOREIGN PATENT DOCUMENTS

| | | | |
|---|---|---|---|
| JP | 201816154 | * | 2/2018 |
| JP | 201840596 | * | 3/2018 |
| KR | 10-1718017 B1 | | 3/2017 |
| KR | 10-1727512 B1 | | 4/2017 |

* cited by examiner

*Primary Examiner* — Octavia Davis Hollington
(74) *Attorney, Agent, or Firm* — NSIP Law (57) ABSTRACT

A force sensing device includes: a frame; a plurality of contact blocks disposed on a first side of the frame; at least one force sensor disposed between adjacent contact blocks among the plurality of contact blocks; and at least one pressing member protruding outwardly from a second side of the frame, wherein the at least one pressing member is disposed in a region corresponding to one or more of the contact blocks.

16 Claims, 5 Drawing Sheets

FORCE SENSING DEVICE AND ELECTRONIC DEVICE INCLUDING FORCE SENSING DEVICE

CROSS-REFERENCE TO RELATED APPLICATIONS

This application claims the benefit under 35 U.S.C. § 119(a) of Korean Patent Application No. 10-2020-0013913 filed on Feb. 5, 2020 in the Korean Intellectual Property Office, the entire disclosure of which is incorporated herein by reference for all purposes.

BACKGROUND

1. Field

The following description relates to a force sensing device and an electronic device including a force sensing device.

2. Description of Related Art

Portable terminals such as laptops, smartphones, and smartpads are generally equipped with a display and an input means for providing information to a user. In order to improve design and performance such as waterproofing and dustproofing of such portable terminals, technologies using a force sensing device as an input means instead of a conventional mechanical button have been researched.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a force sensing device includes: a frame having a plurality of contact blocks disposed on a first side of the frame; at least one force sensor disposed between adjacent contact blocks among the plurality of contact blocks; and at least one pressing member protruding outwardly from a second side of the frame, wherein the at least one pressing member is disposed in a region corresponding to one or more of the contact blocks.

The at least one pressing member may have a shape of a cantilever spring.

The force sensing device may further include a housing coupled to the second side of the frame. The at least one pressing member may be formed integrally with the housing.

The housing may include a plate-shaped member. The at least one pressing member may be formed by a bent portion of the housing.

The at least one pressing member may have an embossing shape.

The housing may include an incision portion cut along a shape of the at least one pressing member.

The at least one pressing member may include pressing members that are spaced apart from one another. At least two pressing members among the pressing members may be disposed such that ends of the at least two pressing members protrude outwardly in different directions.

The force sensing device may further include a circuit board disposed on a surface of the frame. The at least one force sensor may include a plurality of force sensors spaced apart from one another on the circuit board.

In another general aspect, an electronic device includes: a receiving member including a first inner wall and a second inner wall opposing the first inner wall; and a force sensing device disposed in the receiving member. The force sensing device includes: a frame including a plurality of contact blocks disposed on a first side of the frame; a sensor portion disposed between adjacent contact blocks among the plurality of contact blocks; and at least one pressing member protruding outwardly from a second side of the frame to the second inner wall. The at least one pressing member is disposed in a region corresponding to one or more of the contact blocks and is configured to press the one or more of the contact blocks against the first inner wall.

The at least one pressing member may have a shape of a cantilever spring.

The at least one pressing member may include at least one bent portion.

The force sensing device may further include a housing coupled to the second side of the frame. The at least one pressing member may be formed integrally with the housing.

A thickness of the force sensing device may be greater than a distance between the first inner wall and the second inner wall.

The force sensing device may be coupled to the first inner wall and the second inner wall.

The at least one pressing member may have an embossing shape.

The at least one pressing member may have a contact surface in surface contact with the second inner wall.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," "front," "rear," and "side" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. For another example, if the device in the figures is turned around, an element described as being "front" relative to another element will then be "rear" relative to the other element. Thus, the term "front" encompasses both the front and rear orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
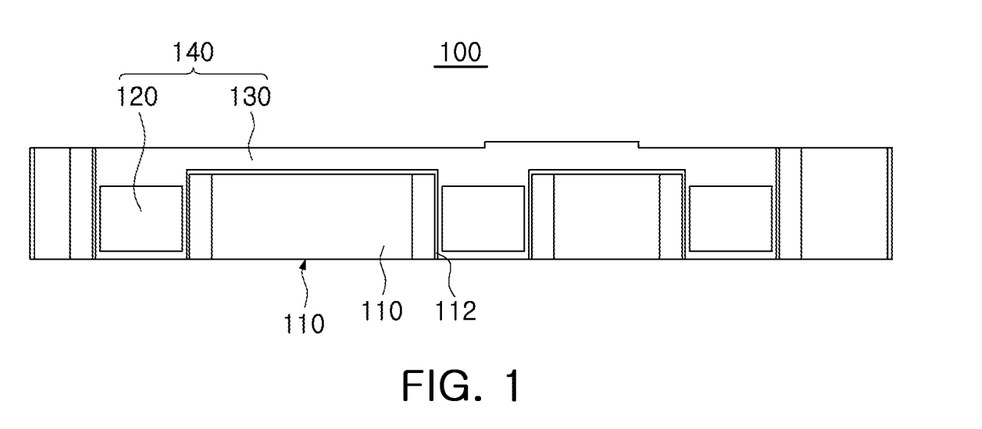
FIG. 1 is a front view of a force sensing device, according to an embodiment.
Figure 2:
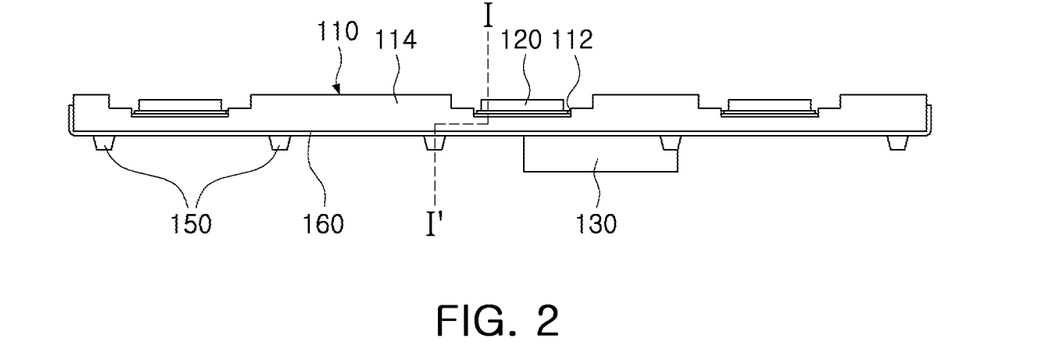
FIG. 2 is a bottom view of the force sensing device shown in FIG. 1.
Figure 3:
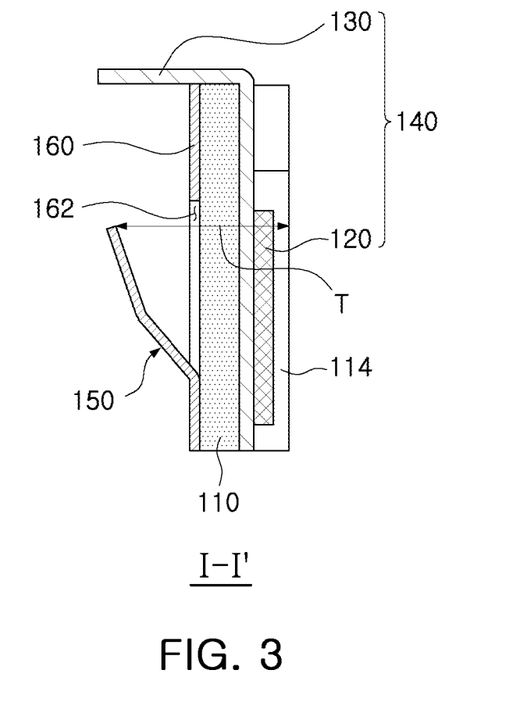
FIG. 3 is a cross-sectional view taken along line I-I' of FIG. 2.
Figure 4:
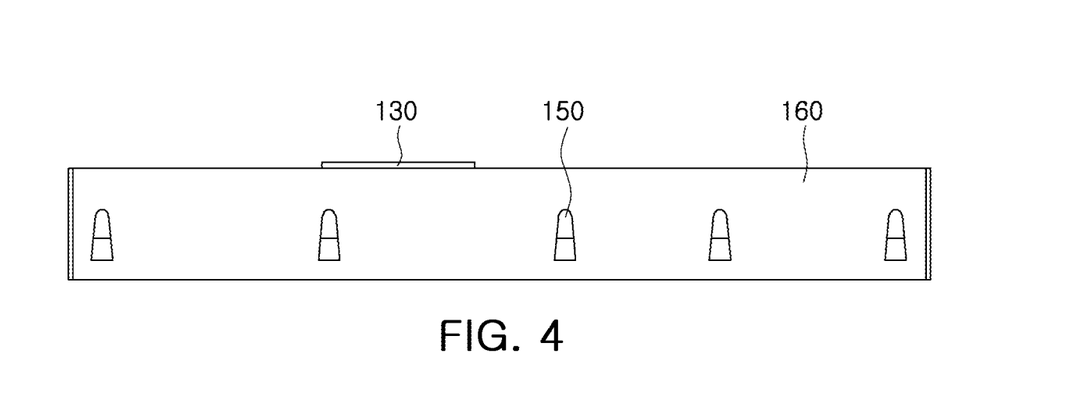
FIG. 4 is a rear view of the force sensing device shown in FIG. 1.

FIG. 1 is a front view of a force sensing device 100, according to an embodiment. FIG. 2 is a bottom view of the force sensing device 100, FIG. 3 is a cross-sectional view taken along line I-I' of FIG. 2. FIG. 4 is a rear view of the force sensing device 100.

Referring to FIGS. 1 to 4, the force sensing device 100 includes, for example, a sensor portion 140, a frame 110, and a housing 160.

The sensor portion 140 may include one or more force sensors 120 (hereafter "force sensors 120"), and may include a connection portion 130 configured to be electrically connected to an electronic device on which the force sensing device 100 is mounted.

A printed circuit board such as a flexible printed circuit board (FPCB) may be used as the connection portion 130, but the connection portion is not limited to being a printed circuit board. The force sensors 120, which will be described later, may be mounted on a first (e.g., front) surface of the connection portion 130, and thus the force sensors 120 may be electrically connected to each other by the connection portion 130.

The force sensors 120 may be disposed to be spaced apart on the connection portion 130.

The force sensing device 100 may include a force sensor 120 including a sensing coil, such as a resonance sensing coil. Specifically, the force sensor 120 may be a sensor that detects a change in a distance between the sensing coil and a case of the electronic device on which the force sensing device 100 is mounted.

The shape of the sensing coil is not particularly limited, and a coil pattern of the sensing coil may have one of various shapes such as a circle, a square, or the like. In addition, the sensing coil may be in a form of a wiring pattern on a PCB or FPCB, or in a form of a chip inductor.

For example, the force sensor 120 may detect that the case (e.g., a metal case) of the electronic device is deformed by a user pressing the case. For example, when a user presses the case, the case is bent in a form in which at least a portion of the case gets closer to the force sensor 120, and, thus, a distance between the resonance sensing coil of the force sensor 120 and the case, which is a conductive object, is changed.

By the above-described change in distance, a magnitude of an eddy current generated in the case changes, and accordingly, a change occurs in an inductance of the sensing coil. Accordingly, the force sensing device 100 may detect a change in pressure on the case based on the change in inductance described above, and recognize the change in pressure as an input signal.

The frame 110 is a member supporting the sensor portion 140, and may include at least one contact block 114 on a first (e.g., front) surface thereof. A space between the contact blocks 114 may include a receiving portion 112 to which the force sensor 120 is coupled. Therefore, the receiving portion 112 may be in a form of a groove, and the force sensor 120, when disposed in the receiving portion 112, may have one surface exposed outwardly of the frame 110.

In the force sensing device 100, the contact block 114 may protrude further outwardly than the force sensor 120. Therefore, a surface of the frame 110 formed by the contact blocks 114 is disposed further outwardly of a surface formed by the force sensor 120. That is, the first surface of the fame 110, which is formed by a surface of the contact block 114, may protrude further outwardly than the one surface of the force sensor 120.

In the illustrated embodiment, a frame 110 has a form in which a plurality of contact blocks 114 and a plurality of receiving portions 112 are formed on a flat plate-shaped body. However, the frame 110 is not limited to the illustrated configuration, and may be modified to have various forms, depending on the structure of the electronic device on which the force sensing device 100 is mounted.

The housing 160 may be coupled to a second (e.g., rear) surface of the frame 110, opposite the first surface of the frame 110.

The housing 160 is coupled to the frame 110 in a form surrounding the second surface and a side surface of the frame 110. Therefore, the housing 160 may be formed in a shape corresponding to the shape of the second surface of the frame 110.

The housing 160 may be formed by bending a flat plate-shaped member such as a metal plate, but is not limited to being formed in this way.

As described above, since the force sensor 120 detects an input signal based on a change in distance from a pressing surface (e.g., a case of an electronic device), to which a user applies pressure, a distance between the force sensor 120 and the pressing surface should be always be maintained to be constant, as long as an user does not apply pressure to the pressing surface.

Figure 5:
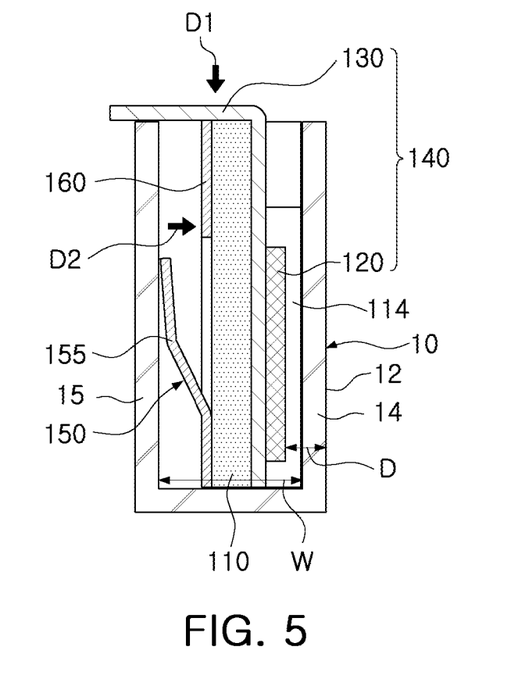
FIG. 5 is a cross-sectional view of an electronic device including the force sensing device of FIGS. 1 to 5.

FIG. 5 is a cross-sectional view of an electronic device on which the force sensing device 100 is mounted. For convenience of description, the only portion of the electronic device shown in FIG. 5 is a receiving member 10 in which the force sensing device 100 is accommodated.

The receiving member 10 has a receiving space in which the force sensing device 100 is accommodated. The receiving space is bounded by a first inner wall 14 of the receiving member and a second inner wall 15 of the receiving member 10 disposed to face the first inner wall 14.

The force sensing device 100 is inserted into the receiving member 10 along the direction D1 of FIG. 5. In this case, in the force sensing device 100, the frame 110 may be spaced apart from the inner walls 14 and 15 of the receiving member 10 due to an assembly tolerance and a manufacturing tolerance. In this case, since the distance between the force sensor 120 and the pressing surface 12 is not uniform, sensing efficiency of the force sensor 120 may be reduced.

Therefore, in order to improve sensing efficiency of the force sensor 120, the force sensing device 100 may include a pressing member 150.

The pressing member 150 is disposed on the second surface of the frame 110 and is configured to press the force sensing device 100 toward the first side of the frame 110. Accordingly, the force sensing device 100 is pressed in the direction D2 of FIG. 5 by a bias force of the pressing member 150 so that one surface of the contact block 114 is maintained in close contact with the first inner wall 14 of the receiving member 10.

To this end, the width of the inner space of the receiving member 10 (W in FIG. 5) may be configured to be slightly less than the thickness of the force sensing device 100 (T in FIG. 3). Here, the width W of the inner space of the receiving member 10 means the shortest distance between the first inner wall 14 and the second inner wall 15. In addition, the thickness T of the force sensing device 100 means the shortest distance between one surface of the frame 110 and the protruding end of the pressing member 150. When the force sensing device 100 is inserted in the receiving member 10, a direction of the thickness T of the force sensing device 100 is the same as a direction of the width W of the inner space of the receiving member 10.

The housing 160 may include an incision portion 162 (FIG. 3) partially cutting the housing 160 along the shape of the pressing member 150. Therefore, the pressing member 150 of the present embodiment may be formed by bending a portion of the housing 160 located inside the incision portion 162 such that the portion of the housing 160 located inside the incision portion 162 protrudes away from the second side of the frame 110.

Accordingly, the pressing member 150 may be formed as a leaf spring or a cantilever spring having one end fixed to the housing 160, and may be formed integrally with the housing 160. In addition, the one end of the pressing member 150 may be connected to the housing 160, and another end of the pressing member 150, which is a free end, may be disposed to be spaced apart from a plane formed by the housing 160 by a predetermined distance.

However, the pressing member 150 is not limited to the description above, and it is also possible to prepare the pressing member 150 as a separate member, and then attach the pressing member 150 to the second surface of the frame 110. In addition, in an example in which the housing 160 is omitted, the pressing member 150 may be integrally configured with the frame 110.

Referring to FIG. 5, the pressing member 150 may have at least one bent portion 155. However, the disclosure is not limited to such a configuration, and various modifications are possible, such as the pressing member 150 having a flat plate-shape without the bent portion 155, or the pressing member 150 being formed in a shape including a curved surface.

A plurality of pressing members 150 may be disposed to be spaced apart along the housing 160/frame 110. Referring to FIG. 2, the pressing member 150 is disposed in a region not corresponding to the receiving portion 112, that is, a region corresponding to the contact block 114. Here, the description of "a region not corresponding to the receiving portion 112" means that, when the pressing member 150 is virtually projected onto the first surface of the frame 110, a region in which the virtually projected pressing member 150 is disposed does not overlap with the receiving portion 112. Thus, the description of "a region corresponding to the contact block 114" means that, when the pressing member 150 is virtually projected onto the first surface of the frame 110, a region in which the virtually projected pressing member 150 is disposed overlaps with the contact block 114. In other words, the pressing members 150 are aligned with portions of respective contact blocks 114 in a length direction of the force sensing device 100 that is perpendicular to the thickness direction T, and the pressing members 150 are not aligned with the contact blocks 114 in the length direction.

If the pressing member 150 were disposed in a region corresponding to the receiving portion 112, force exerted by the pressing member 150 may be transferred to the force sensor 120 disposed in the receiving portion 112, and thus, the force sensor 120 may be deformed or damaged.

Therefore, in the illustrated example, the pressure member 150 may be disposed in the region corresponding to the contact block 114, rather than the region corresponding to the portion on which the force sensor 120 is disposed, thereby preventing the force sensor 120 being deformed or damaged.

In addition, if the pressing member 150 were disposed in a region corresponding to the receiving portion 112 and a difference in elastic force provided by each pressing member 150 were to exist, a separation distance between each force sensor 120 and the pressing surface 12 may also be different.

However, the force sensing device 100 according to the embodiment of FIGS. 1-5 disposes the pressing member 150 in a region corresponding to the contact block 114, not a region corresponding to the receiving portion 112. Accordingly, since the pressing member 150 presses only the contact block 114 of the frame 110 toward the first inner wall of the receiving member 10, the distance between the force sensors 120 and the pressing surface 12 may be kept constant.

Additionally, the force sensing device 100 is coupled to the electronic device in a manner such that the force sensing device 100 is inserted into the receiving member 10 of the electronic device. Therefore, the force sensing device 100 is easy to assemble and combine with the electronic device.

In addition, since the force sensing device 100 includes the pressing member 150, even if there is an assembly tolerance in the force sensing device 100 or the receiving member 10 of the electronic device, the distance between the force sensor 120 and the pressing surface 12 of the electronic device can be kept constant. Accordingly, sensing sensitivity of the force sensor 120 can be improved.

However, this disclosure is not limited to the above-described embodiment, and various applications are possible.

FIGS. 6 to 9 are views schematically illustrating force sensing devices, according to embodiments, in a state of being coupled to the receiving member 10 of the electronic device.

Figure 6:
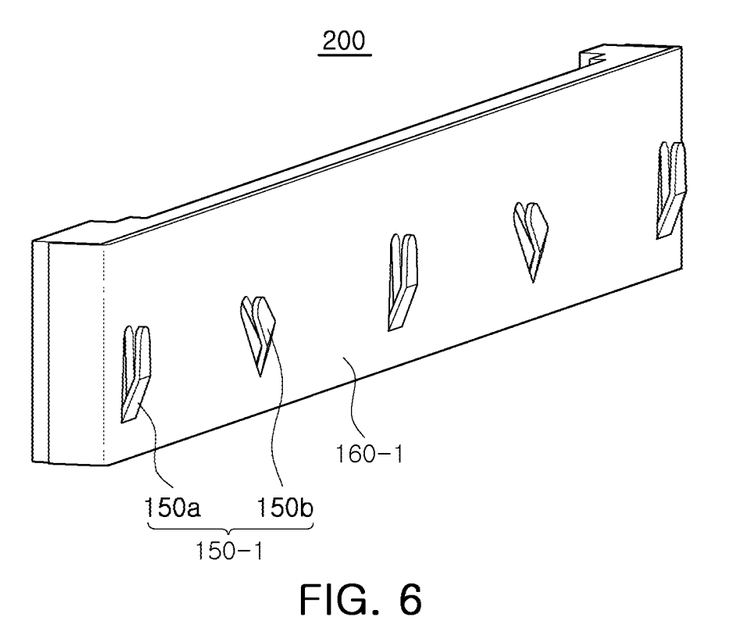
FIGS. 6 to 9 are views schematically illustrating force sensing devices, according to embodiments.

Referring to FIG. 6, a force sensing device 200, according to tan embodiment, is configured similarly to the force sensing device 100 described above, and differs only in the a shape of pressing members 150-1 of a housing 160-1.

The plurality of pressing members 150-1 of the force sensing device 200 include at least two pressing members 150a and 150b having free ends protruding outwardly to face different directions.

For example, the plurality of pressing members 150-1 may include the first pressing member 150a having a free end that protrudes upward, and the second pressing member 150b having a free end that protrudes in a direction rotated 45° with respect to the direction in which the free end of the first pressing member 150a protrudes. However, the disclosure is not limited to this configuration, and the plurality of pressing members 150-1 may be disposed in various forms as long as they can be easily inserted into the receiving member 10.

Figure 7:
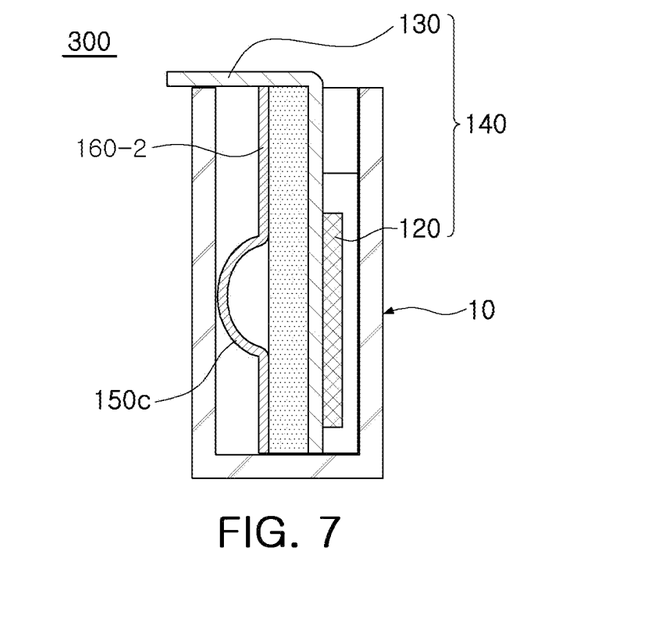

In a force sensing device 300 shown in FIG. 7, a pressing member 150c is formed in a semi-spherical shape on a housing 160-2. In a force sensing device 400 shown in FIG. 8, a pressing member 150d is formed on a housing 160-3, in a shape in which the pressing member 150d has a shape of a bisected hemisphere.

When the pressing member 150c is formed in a semi-spherical shape as shown in FIG. 7, the pressing member 150 may be formed in an embossing shape through press processing. In this case, the housing 160 may not be cut.

Figure 8:
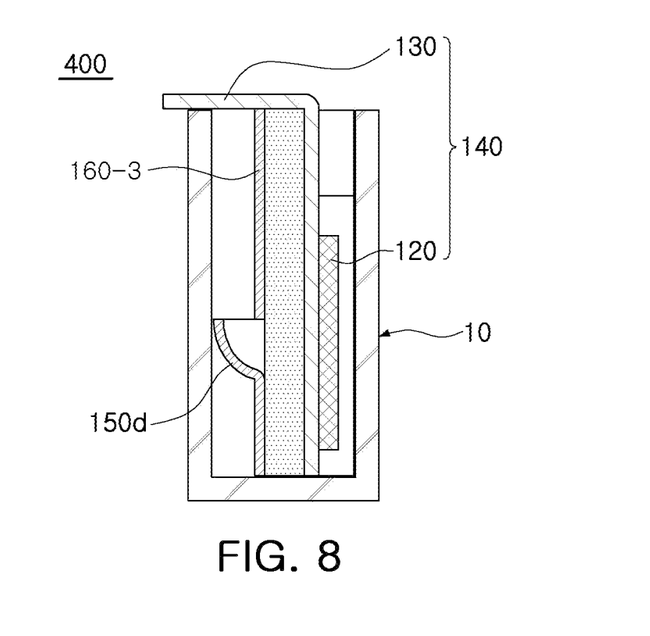

In addition, when the pressing member 150 is formed in the shape shown in FIG. 8, the pressing member 150d may be formed by partially cutting the housing 160 and then press processing the cut-out portion of the housing 160.

When the pressing members 150c and 150d are configured as described above, the pressing members 150c and 150d may be coupled to the receiving member 10 of the electronic device by being fitted into and coupled to the receiving member 10, or being force fitted into the receiving member 10.

Figure 9:
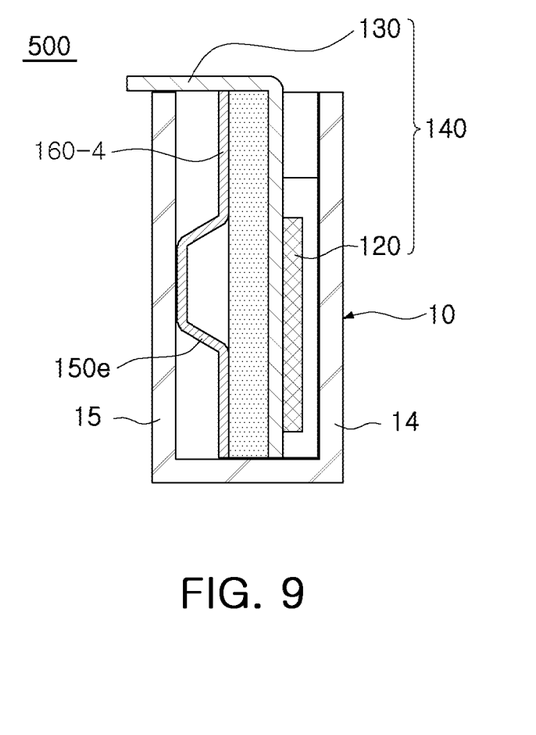

A pressing member 150e of a force sensing device 500 shown in FIG. 9 is formed on a housing 160-4 in an embossing form through press processing, similar to the pressing member 150c shown in FIG. 7. A portion of a pressing member 150e is formed to be in surface contact with the second inner wall 15 of the receiving member 10.

In the embodiment of FIG. 9, the pressing member 150e is configured such that a contact surface of a square shape is in surface contact with the second inner wall 15 of the receiving member 10. However, the disclosure is not limited to this configuration, and various modifications such as forming a contact surface in a circular shape or a polygonal shape are possible.

Thus, the pressing member may be modified in various forms as long as one surface of the force sensing device can be in close contact with the inner wall of the receiving member.

As set forth above, according to embodiments disclosed herein, a force sensing device may be coupled to an electronic device in a manner in which the forces sensing device is inserted into a receiving member provided in the electronic device. Therefore, the force sensing device is easy to assemble and combine with the electronic device.

In addition, since the pressing member is provided in the force sensing device, a distance between a force sensor and a pressing surface of the electronic device may be kept constant even if there is an assembly tolerance of the force sensing device or the receiving member of the electronic device. Accordingly, sensing sensitivity of the force sensor may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In addition, respective embodiments may be combined with each other. For example, the pressing members disclosed in the above-described embodiments may be used in combination with each other in one force sensing device. Therefore, the scope of the disclosure is defined not by the detailed description, but by the claims and their equivalents, and all variations within the scope of the claims and their equivalents are to be construed as being included in the disclosure.

What is claimed is:

1. A force sensing device, comprising:
a frame having a plurality of contact blocks disposed on a first side of the frame;
at least one force sensor disposed between adjacent contact blocks among the plurality of contact blocks; and
at least one pressing member protruding outwardly from a second side of the frame, and configured to press the frame in a direction from the second side of the frame to the first side of the frame,
wherein the at least one pressing member is disposed in a region corresponding to one or more of the contact blocks, and
wherein the first side of the frame and the second side of the frame face opposite directions.

2. The force sensing device of claim 1, wherein the at least one pressing member has a shape of a cantilever spring.

3. The force sensing device of claim 2, wherein the at least one pressing member comprises pressing members that are spaced apart from one another, and
wherein at least two pressing members among the pressing members are disposed such that ends of the at least two pressing members protrude outwardly in different directions.

4. The force sensing device of claim 1, further comprising a housing coupled to the second side of the frame,
wherein the at least one pressing member is formed integrally with the housing.

5. The force sensing device of claim 4, wherein the housing comprises a plate-shaped member, and
wherein the at least one pressing member is formed by a bent portion of the housing.

6. The force sensing device of claim 4, wherein the at least one pressing member has an embossing shape.

7. The force sensing device of claim 4, wherein the housing comprises an incision portion cut along a shape of the at least one pressing member.

8. The force sensing device of claim 1, further comprising a circuit board disposed on a surface of the frame,
wherein the at least one force sensor comprises a plurality of force sensors spaced apart from one another on the circuit board.

9. An electronic device, comprising:
a receiving member comprising a first inner wall and a second inner wall opposing the first inner wall; and
a force sensing device disposed in the receiving member, and comprising:
a frame comprising a plurality of contact blocks disposed on a first side of the frame;
a sensor portion disposed between adjacent contact blocks among the plurality of contact blocks; and
at least one pressing member protruding outwardly from a second side of the frame to the second inner wall,
wherein the at least one pressing member is disposed in a region corresponding to one or more of the contact blocks and is configured to press the one or more of the contact blocks against the first inner wall, and is further configured to press the frame in a direction from the second side of the frame to the first side of the frame, and
wherein the first side of the frame and the second side of the frame face opposite directions.

10. The electronic device of claim 9, wherein the at least one pressing member has a shape of a cantilever spring.

11. The electronic device of claim 10, wherein the at least one pressing member comprises at least one bent portion.

12. The electronic device of claim 9, wherein the force sensing device further comprises a housing coupled to the second side of the frame, and
wherein the at least one pressing member is formed integrally with the housing.

13. The electronic device of claim 9, wherein a thickness of the force sensing device is greater than a distance between the first inner wall and the second inner wall.

14. The electronic device of claim 13, wherein the force sensing device is coupled to the first inner wall and the second inner wall.

15. The electronic device of claim 13, wherein the at least one pressing member has an embossing shape.

16. The electronic device of claim 13, wherein the at least one pressing member has a contact surface in surface contact with the second inner wall.

* * * * *